Oct. 11, 1966  S. M. MOBERG  3,278,214
SELF-LOCKING SHACKLE SEAL
Filed July 16, 1964
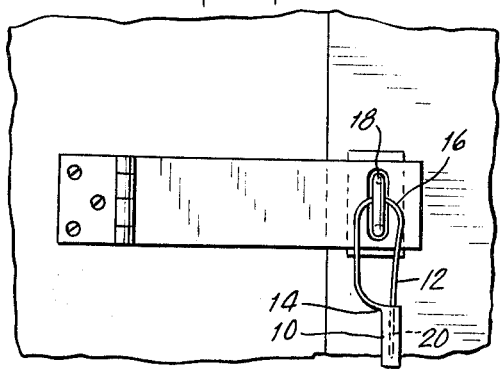
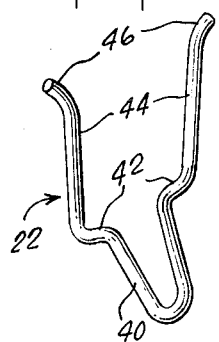
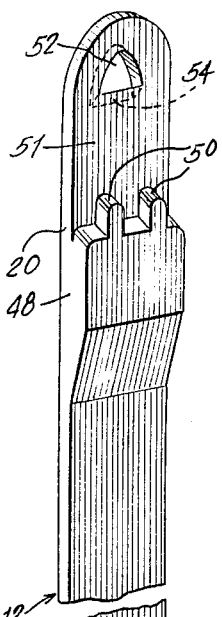
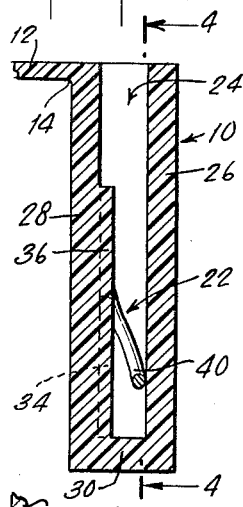
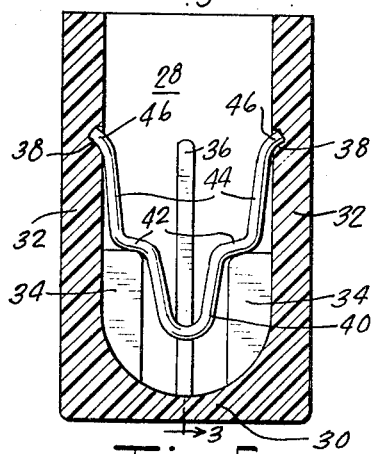
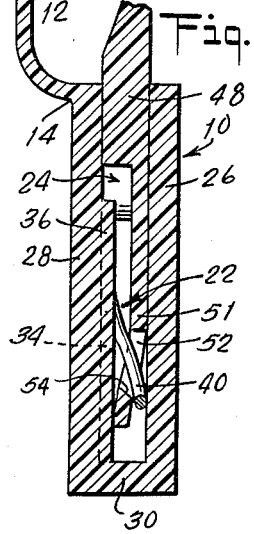
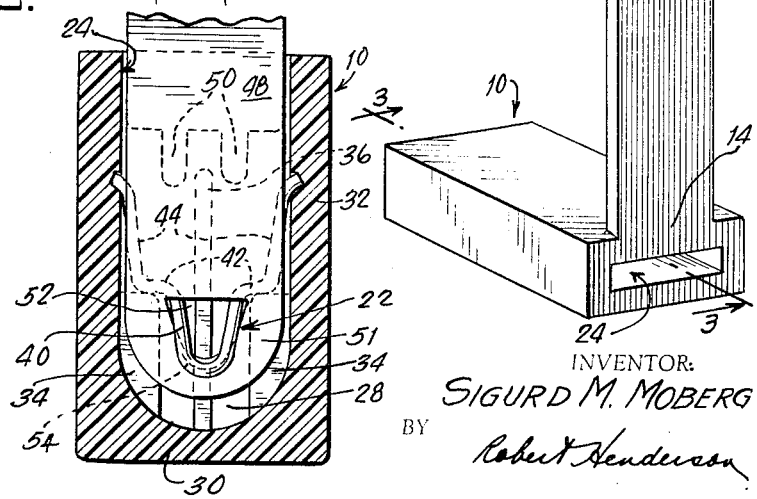
INVENTOR:
SIGURD M. MOBERG
BY
Robert Henderson
ATTORNEY United States Patent Office 3,278,214
Patented Oct. 11, 1966

3,278,214
SELF-LOCKING SHACKLE SEAL
Sigurd M. Moberg, East Orange, N.J., assignor to E. J. Brooks Company, Newark, N.J., a corporation of New Jersey
Filed July 16, 1964, Ser. No. 383,046
10 Claims. (Cl. 292—318)

This invention relates to shackle seals which are self locking upon insertion of a portion of the seal's shackle into a locking head of the seal, thereby avoiding the need for the one applying the seal to be provided with a special tool for deforming a part of a the seal to lock it in closed condition.

An important object of this invention is the provision of such a seal which can be more economically manufactured than such seals hitherto provided.

Another important object is the provision of such a seal which is lighter and less cumbersome than prior seals, thereby minimizing shipping costs and enabling a user conveniently to carry a number of the seals on his person.

Another important object is the provision of such a seal which is safer to use than comparable seals of metal which sometimes cut the user unless very carefully handled and used.

Another important object is the provision of such a seal which is very durable and strongly opposes attempts to open it.

The foregoing objects are derived from this invention of which a preferred embodiment is illustrated in the accompanying drawing without, however, limiting the invention of that particular embodiment.

In the drawing:

FIGURE 1 is an elevational view of the seal as applied to a hasp.

FIG'. 2 is an enlarged perspective view of the seal as manufactured and before use.

FIG. 3 is a further enlarged sectional view substantially on the lines 3—3 of FIGS. 2 and 4, showing some details of the seal's locking head.

FIG. 4 is a sectional view on the line 4—4 of FIG. 3, showing further details of the seal's locking head.

FIGS. 5 and 6 are sectional views which, respectively, show the same details of the locking head at the same planes as FIGS. 3 and 4, but show, additionally, a locking tab at an end of the seal's shackle inserted in locked position within the locking head.

FIG. 7 is a separate, perspective view of a wire latch member employed in the locking head.

The principal components of the seal are a locking head or block 10 and a flexible shackle 12 integral, at one end, with the head at 14 and shown in FIG. 1 as formed into a loop 16 extending through a hasp eye 18 with the shackle's locking end 20 firmly locked within the head 10 as indicated in broken lines in FIG. 1.

With the exception of a wire latch member 22, hereinafter described in detail, the disclosed seal is formed of molded plastic material which enables the device to function in the manner hereinafter described. One such material strongly recommended for this seal is molded polypropylene which, in relatively thin sections, may be flexed a great number of times without material weakening or breaking.

Those familiar with molding practice will observe that the shackle 12 and locking head 10, including certain hereinafter described formations on the former and within the latter, may be formed in one piece in a single molding operation in which molding die movement is in a plane substantially perpendicular to the general plane of the shackle.

The locking head 10 is a rectangular block, formed by molding, with a socket or cavity 24 defined by walls hereinafter referred to, for convenience, as a top wall 26, a bottom wall 28, an end wall 30, and side wall 30, and side walls 32. The end of the socket opposite to the end wall 30 is open for insertion thereinto of a portion of the shackle as hereinafter explained.

At the inner end of the socket 24 are two spaced, oppositely formed but otherwise similar lands 34 which are integral with side walls 32, end wall 30 and bottom wall 28, and extend above the latter with their top surfaces parallel to the wall 28 and spaced substantially from the top wall 26.

Also integral with the bottom wall 28, and extending upwardly therefrom to about the same level as the top surfaces of the lands 34, is a straight rib 36. This rib is located midway between and parallel to the side walls 32 and between and spaced from the two lands 34. It extends from the end wall 30 somewhat more than half way to the open end of the socket 24.

The lands and rib in the socket 24 are conveniently formed incident to the molding of the seal. After completion of the molding, internal notches 38 are cut into or otherwise formed in the side walls 32 by a suitable tool which may be inserted into the socket 24 through the latter's open end. The wire latch member 22 is of a conventional configuration as may be seen by reference to FIGS. 3–7.

The latch member 22 is preferably of suitable spring wire, bent to a shape which may be considered as a modified U or a modified V. A central portion of the wire is bent to form a U-shaped locking nose 40 from both sides of which the wire extends outwardly to form shoulders 42, thence opposite parts of the wire extend rearwardly, i.e., in a direction away from the locking nose, to form side portions 44, and opposite ends of the wire extend outwardly and rearwardly from the side portions to form anchoring prongs 46.

It may be noted that the side portions 44, the prongs 46 and also, preferably, the shoulders 42 of the latch member are coplanar, and that the locking nose 40 is bent to project upwardly and forwardly at an acute angle from the remainder of the latch member.

After molding of the plastic parts of the seal and the formation of the notches 38, in the manufacture of the seal, the wire latch member 22 is pushed, nose first with the latter slanting upwardly, into the socket 24 through the latter's open end. If the member 22 is of spring wire, as recommended, it is somewhat wider, in its relaxed or unstressed condition, than the distance between the side walls 32. During insertion, the latch member is contracted until, upon reaching its final position, the anchoring prongs 46 snap outwardly into the notches 38 thereby anchoring the latch member securely in place within the locking head.

It may be noted from FIGS. 3 and 4 that the prongs 46, side portions 44, and the shoulders 42 of the finally positioned latch member are coplanar with the rib 36 and the lands 34 and bear upon the bottom wall 28; and the locking nose 40 angles upwardly and forwardly above the rib 36 into, preferably, firm but resiliently yieldable engagement with the inside surface of the top wall 26. The notches 38 tend to limit the extent to which the latch member 22 may be moved inwardly in being inserted; however, such inward movement is positively limited by engagement of the latch member's shoulders 42 with the back ends of the lands 34.

The shackle 12 is generally in the nature of a relatively thin, flexible strap of a width, at least at and adjacent to its end portion 20, slightly less than the greater dimension, i.e. the width, of the opening of the socket 24. Spaced from the extremity of the end portion 20, the bottom face of the shackle has a thickened portion 48 formed with a pair of projections 50 which are spaced apart to an extent slightly greater than the width of the rib 36 and extend forwardly toward the adjacent extremity of the shackle. The part of the shackle between the thickened portion 48 and the shackle's mentioned extremity is a relatively thin locking tab 51 formed with an aperture 52. The aperture's transverse back edge is preferably beveled as at 54 thereby forming a thin edge at the bottom face of the locking tab.

The seal is used by extending the free end of the shackle 12 through the hasp eye 18 and by then pushing the shackle's free end forwardly into the socket 24. As the shackle is flat and cannot easily be materially twisted, the locking tab 51 and the thickened shackle portion 48 are normally introduced into the socket 24 in the relationship to the internal parts of the locking head 10 shown in FIGS. 5 and 6. The locking tab 51, during its introduction into the locking head, is guided upwardly, above the latch member 22, by the rib 36, then wedges itself between the latch member's locking nose 40 and the top wall 26, flexing said nose away from the top wall until the aperture 52 lines up with the end of the nose 40, whereupon the latter snaps into said aperture to retain the shackle end within the locking head as shown in FIGS. 5 and 6.

During the just-described cooperation between the locking tab 51 and the locking nose 40, the thickened portion 48 of the shackle enters the socket 24 to the extent that the projections 50 straddle the end of the rib 36. As said thickened portion is rectangular and is a close fit within the socket 24, the shackle is held against skewing within the locking head. The thickened portion also acts as a blockade to prevent the insertion of any tool into the socket to disengage the locking tab 51 from the locking nose 40 to open the seal without destroying it.

Any attempt to pull the locked shackle from within the locking head causes the beveled edge 54 to wedge the end of the locking tab 51 into its position underneath the locking nose 40 as shown in FIG. 5. The wire of the latch member 22 is stiff enough that such a pull and wedging action does not deform the latch member and the aperture 52 is of such width that the locking nose passes through it to bring areas of the locking tab 51, which define said aperture, into positive abutment with the shoulders 42 of the latch member.

The wire of the latch member is preferably circular or rounded in cross section so that, if the shackle is pulled in an attempt to open the seal, the wire will not cut into the material of the locking tab 51.

Such pulling, moreover, cannot dislodge the latch member because a forceful pull on the shackle, transmitted to the latch member, would cause the latter's prongs 46, because of their indicated angularity, to become embedded in the material of the locking head's side walls 32. In that situation, the latch member is held even more firmly than normally within the locking head and the attempt to open the seal fails.

An interloper, seeking to get at goods in an area closed off by the sealed hasp, would probably attempt to pull the seal open so that he could again close it to defer, for a time, the discovery of his depradations. As such pulling would not dislodge the latch member, continued forceful pulling of the shackle could only cause the shackle to break at opposite sides of the aperture 52 where the shackle is narrow and relatively weak, thereby rendering the shackle non-reusable.

When the seal is to be opened at the proper time by an authorized person, the shackle is forcefully pulled to break it at the aperture 52 or the loop may be severed by a knife or other cutting instrument. The seal, thus destroyed, is discarded; this practice being amply justified by the low cost of the seal.

The described seal is inexpensive to manufacture, it is lighter and less cumbersome than prior seals, it is very durable, it cannot be opened except by being destroyed and, as the plastic material does not present sharp edges, it is safer than prior seals to handle and use.

It should be apparent that the concepts disclosed herein may be utilized in various other ways without, however, departing from this invention as set forth in the following claims.

I claim:
1. A self-locking shackle seal comprising a molded plastic locking head formed with a socket therein having an open end, a bendable shackle fixed to the locking head and having an apertured locking tab at its free end, and a wire latch member within said locking head; said member having anchoring prongs at opposite sides thereof anchored in opposite side walls of said socket and a locking nose intermediate said prongs and facing away from the socket's open end with its end in yieldable engagement with an inside surface of the socket; and the locking tab being adapted for insertion into the socket through the latter's open end and between said locking nose and said inside surface of the socket to bring the aperture of the locking tab into alignment with and around the locking nose to cause the latter to hold the locking tab against withdrawal from the socket.

2. A self-locking shackle seal according to claim 1, the shackle having a thickened portion spaced from its free end, which portion substantially closes the open end of the socket when the locking tab is locked therewithin.

3. A self-locking shackle seal according to claim 2, said thickened portion being non-circular in transverse sectional shape and the socket, adjacent its open end, being a close complemental fit with said thickened portion whereby to oppose movement of the shackle, other than longitudinal movement within the locking head.

4. A self-locking shackle seal according to claim 1, the shackle being molded integrally with the locking head and of similar plastic material.

5. A self-locking shackle seal according to claim 4, the plastic material of the locking head and the shackle being polypropylene.

6. A self-locking shackle seal according to claim 1, the socket having spaced transverse shoulders therein and the latch member having transverse shoulders coacting with the socket's said shoulders to limit forward movement of the latch member.

7. A self-locking shackle seal according to claim 6, the locking tab, when engaged around the latch member's locking nose, having portions in interfering relation to the latch member's said shoulders to limit rearward movement of the locking tab relatively to the latch member.

8. A self-locking shackle seal according to claim 1, said anchoring prongs extending outwardly and rearwardly and having extremities tending to become embedded in said side walls in the presence of rearward urging of the latch member.

9. A self-locking shackle seal according to claim 1, the wire of the latch member being rounded in cross-sectional shape and of such thickness that lateral cutting thereof into adjacent plastic material is avoided.

10. A self-locking seal comprising a hollow locking head having an opening to the interior thereof and a bendable shackle molded, integrally with said locking head, of plastic material, and a generally U-shaped latch member of resilient wire anchored within said head; the latch member having a central, forwardly extending nose in yieldable, acute angular engagement with a wall of the head and similar, rearwardly and laterally outwardly directed anchoring extremities, at the ends of side portions of the latch member, retained, by the resiliency of the wire, in internal notches formed in opposed, internal walls of the locking head, and the shackle having, at its free end, a locking tab insertable through said opening and forwardly within said head; the locking tab being formed with an aperture therein and being adapted, in such forward movement to extend between said nose and wall to a point at which the extremity of the nose becomes aligned with said aperture, causing the nose to enter said aperture and thereby capture the locking tab against withdrawal from the locking head.

References Cited by the Examiner

UNITED STATES PATENTS

| | | | |
|---|---|---|---|
| 514,786 | 2/1894 | Sturtevant | 292—318 |
| 887,926 | 5/1908 | Davis. | |
| 927,294 | 7/1909 | Stover et al. | 292—318 |
| 3,157,421 | 11/1964 | Nierhaus | 292—322 |

EDWARD C. ALLEN, *Primary Examiner.*

RICHARD E. MOORE, *Examiner.*

Dedication 3,278,214.—*Sigurd M. Moberg*, East Orange, N.J. SELF-LOCKING SHACKLE SEAL. Patent dated Oct. 11, 1966. Dedication filed Feb. 9, 1972, by the assignee, *E. J. Brooks Company*.

Hereby dedicates to the Public the term thereof remaining after Oct. 1, 1970.

[*Official Gazette June 13, 1972.*]